(12) United States Patent
Wang et al.

(10) Patent No.: US 9,894,397 B2
(45) Date of Patent: Feb. 13, 2018

(54) CONTROLLING BIT-RATES FOR MEDIA STREAMING SESSIONS

(75) Inventors: Wenyi Wang, Cupertino, CA (US); Jing Hu, Goleta, CA (US); Juiping Liao, San Jose, CA (US); Rong Wang, Cupertino, CA (US); Duanpei Wu, San Jose, CA (US); Shih-Cheng Stan Yan, Saratoga, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1289 days.

(21) Appl. No.: 13/326,411

(22) Filed: Dec. 15, 2011

(65) Prior Publication Data

US 2013/0159495 A1 Jun. 20, 2013

(51) Int. Cl.
| | | |
|---|---|---|
| H04N 21/2662 | (2011.01) | |
| H04N 21/2343 | (2011.01) | |
| H04N 21/24 | (2011.01) | |
| H04N 21/442 | (2011.01) | |
| H04N 21/6373 | (2011.01) | |
| H04N 21/647 | (2011.01) | |
| H04N 19/146 | (2014.01) | |
| H04N 19/164 | (2014.01) | |

(52) U.S. Cl.
CPC ....... *H04N 21/2662* (2013.01); *H04N 19/146* (2014.11); *H04N 19/164* (2014.11); *H04N 21/2343* (2013.01); *H04N 21/2402* (2013.01); *H04N 21/44209* (2013.01); *H04N 21/6373* (2013.01); *H04N 21/64738* (2013.01); *H04N 21/64792* (2013.01)

(58) Field of Classification Search
CPC ............... H04N 19/146; H04N 19/164; H04N 21/2343; H04N 21/2402; H04N 21/2662; H04N 21/44209; H04N 21/6373; H04N 21/64738; H04N 21/64792; H04L 19/146; H04L 19/164
See application file for complete search history.

(56) References Cited

U.S. PATENT DOCUMENTS

| | | |
|---|---|---|
| 5,633,861 A | 5/1997 | Hanson et al. |
| 5,751,708 A | 5/1998 | Eng et al. |
| 5,802,106 A | 9/1998 | Packer |
| 6,038,216 A | 3/2000 | Packer |
| 6,046,980 A | 4/2000 | Packer |

(Continued)

OTHER PUBLICATIONS

Warner et al., "Codec Control Messages in the RTP Audio-Visual profile with Feedback (AVPF)", RFC 5104 Standards Track, Feb. 2008, pp. 1-65, printed from http://tools.ietf.org/html/rfc5104 on Sep. 23, 2011.

(Continued)

*Primary Examiner* — Larry Donaghue
(74) *Attorney, Agent, or Firm* — Haynes and Boone, LLP

(57) ABSTRACT

In one embodiment, a method includes (a) discerning whether an average packet delay in a media streaming session is increasing or decreasing over a first defined time window, (b) discerning whether an average jitter in the media streaming session is increasing or decreasing over a second defined time window, (c) in response to (a) and (b), calculating a specific bit-rate quantity corresponding to a change in bit-rate, and (d) controlling a bit-rate of the media streaming session in accordance with the specific bit-rate quantity.

14 Claims, 3 Drawing Sheets

(56) References Cited

U.S. PATENT DOCUMENTS

| | | | |
|---|---|---|---|
| 6,078,953 | A | 6/2000 | Vaid et al. |
| 6,118,791 | A | 9/2000 | Fichou et al. |
| 6,438,101 | B1 | 8/2002 | Kalampoukas et al. |
| 6,456,630 | B1 | 9/2002 | Packer et al. |
| 6,574,216 | B1 | 6/2003 | Farris et al. |
| 6,826,620 | B1 | 11/2004 | Mawhinney et al. |
| 6,888,801 | B1 | 5/2005 | Hock |
| 7,085,230 | B2 | 8/2006 | Hardy |
| 7,088,677 | B1 | 8/2006 | Burst, Jr. |
| 7,515,583 | B2 | 4/2009 | Kamani et al. |
| 7,545,748 | B1 * | 6/2009 | Riddle .................. H04L 43/08 370/230 |
| 7,606,164 | B2 * | 10/2009 | Anandakumar et al. ..... 370/252 |
| 7,848,238 | B1 * | 12/2010 | Pawar et al. ................ 370/235 |
| 2003/0035374 | A1 * | 2/2003 | Carter .................. H04L 45/00 370/235 |
| 2003/0152032 | A1 * | 8/2003 | Yanagihara et al. ....... 370/236.1 |
| 2004/0085901 | A1 * | 5/2004 | Hooper ............... H04L 12/5601 370/235 |
| 2006/0039280 | A1 * | 2/2006 | Anandakumar et al. ..... 370/229 |
| 2006/0120282 | A1 * | 6/2006 | Carlson ............... H04L 12/2602 370/229 |
| 2008/0049615 | A1 * | 2/2008 | Bugenhagen ............ 370/230.1 |
| 2011/0026399 | A1 * | 2/2011 | Strulo et al. .................. 370/230 |

OTHER PUBLICATIONS

Floyd and Jacobson, "Link-Sharing and Resource Management Models for Packet Networks," vol. 3, No. 4, IEEE/ACM Transactions on Networking, Aug. 1995, 23 pgs.

Balakrishnan et al, "The Effects of Asymmetry on TCP Performance," Computer Science Div., U of C at Berkeley, 1997, 13 pgs.

Information Sciences Institute, U of SC, "RFC:793 Transmission Control Protocol, DARPA Internet Program, Protocol Specification," Sep. 1, 1981, 89 pgs.

\* cited by examiner

CONTROLLING BIT-RATES FOR MEDIA STREAMING SESSIONS

TECHNICAL FIELD

The present disclosure relates generally to controlling media streaming sessions.

BACKGROUND

Video optimization, especially for interactive video and audio applications (UC&C VoIP, video telephony, video conference, live-streaming, etc), uses network media services, such as congestion management, network traffic engineering, and network status feedback to allow new rate-adaptive video endpoints to adapt to the network condition effectively. There are two feedback sources: 1) decoder endpoint, and 2) network routers/switches on the RTP path. The endpoint feedback may include up-speed and/or down-speed information via, e.g., RTCP protocol Receiver Report (RR) (lost count, jitter, delay), and RTCP Feedback (FB) extensions, defined in RFC5104. Network feedback may include Explicit Congestion Notification (ECN) and/or Pre-Congestion Notification (PCN) markings. The PCN/ECN is a mechanism for the router to signal the network congestion status; the ratio of PCN/ECN marked packets is used to indicate the congestion severity. Currently the ECN/PCN is widely supported for TCP protocol, while support of UDP protocol is still limited.

Currently, most rate-adaptive encoders rely on the RTCP RR report and FB to adapt the rate. The up-speed rate-adaption is simply a wait-and-see heuristic algorithm that gradually increases the bit-rate if there is no packet loss within an interval. Furthermore, if an RTP packet is lost and a receiver reports it in a RR, the encoder will drop the bit-rate accordingly, depending on the packet loss rate. This mechanism is used after the error (in this case, lost packets) has happened. It would be desirable to adapt the bit-rate before congestion occurs.

DESCRIPTION

Overview

Figure 1:
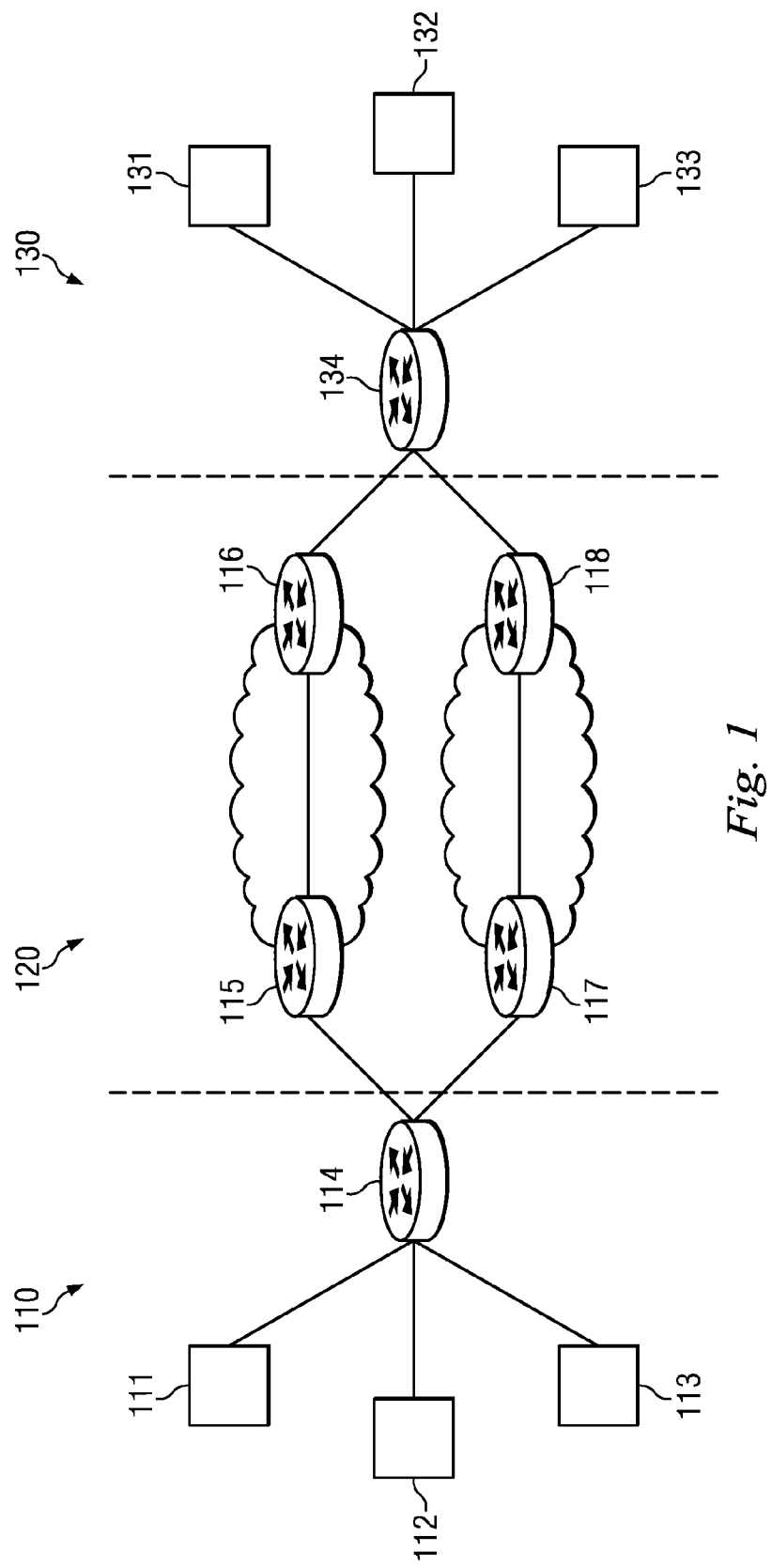
FIG. 1 is an illustration of an example system adapted according to one embodiment.

In one embodiment, a method includes (a) discerning whether an average packet delay in a media streaming session is increasing or decreasing over a first defined time window, (b) discerning whether an average jitter in the media streaming session is increasing or decreasing over a second defined time window, (c) in response to (a) and (b), calculating a specific bit-rate quantity corresponding to a change in bit-rate, and (d) controlling a bit-rate of the media streaming session in accordance with the specific bit-rate quantity.

In another embodiment, an apparatus includes a network input/output, a processor, and a memory in communication with the processor, the memory including instructions executable by the processor to perform the following operations: a first operation that analyzes data received through the network input/output to calculate an average packet delay trend for a media streaming session and a jitter trend for the media streaming session, a second operation that calculates a quantified up-speed or down-speed value in response average packet delay trend and the jitter trend, and a third operation that controls a bit-rate of the media streaming session according to the quantified up-speed or down-speed value.

In another embodiment, logic is encoded in one or more tangible media for execution and when executed the logic is operable to: (a) calculate whether an average packet delay in a media streaming session is moving lower or higher, (b) calculate whether a jitter in the media streaming session is improving or worsening, (c) store a record of historical values for jitter and average packet delay and historical values for streaming bit-rate correlated with respective historical values for jitter and average packet delay, (d) in response to (a) and (b) calculate a difference between a current streaming bit-rate and a specific one of the historical values for streaming bit-rate to generate an up-speed or down-speed value, and (e) control a bit-rate of the media streaming session according to the up-speed or down-speed value.

In another embodiment, a method includes: in a network device conveying packets for multiple streams, in which the network device is included in a feedback loop with a sending endpoint, determining by the network device desired relative bit rates among the multiple streams, and controlling the multiple streams to achieve the relative bit rates by manipulating a packet drop rate and/or ECN/PCN ratio of at least one of the multiple streams.

Description of Example Embodiments

In order to optimize video quality, interactive video applications use feedback from network devices and/or decoding endpoints (also referred to as receiving endpoints) to adapt the video bit-rate to actual available bandwidth of the network dynamically. In some embodiments the feedback messages carry quantity of bandwidth reduction or increment, in addition to information indicating the bit loss rate or an up-speed request. Further in some embodiments, endpoints and/or network devices that generate specific bandwidth quantity suggestions generate such suggestions using advanced metrics, such as a delay trend, a jitter trend, and an actual bit-rate history.

New rate-adaptive encoding endpoints (also referred to as sending endpoints) adapt a video bit-rate accordingly in response to received feedback messages. The network-based congestion management and congestion prediction are used for the new rate-adaptive video endpoints. In some embodiments, network-based feedback provides more information than endpoint-based feedback by virtue of the fact that network routers/switches are able to collect information from more than one session. Various embodiments propose a network service for the rate-adaptive video applications to adapt bit-rate more accurately, though the scope of embodiments includes endpoint-based actions as well. Furthermore, while the examples herein refer to video applications, the scope of embodiments applies to any streamed media, whether or not video is included.

FIG. 1 is an illustration of an example system adapted according to one embodiment. Network 110 includes multiple endpoint devices 111-113. Router 114 serves network 110 by connecting network 110 to a second network 120. In one example, network 110 may include an enterprise network or Local Area Network (LAN) that serves an entity, such as a business or a consumer household.

Devices 111-113 may include any kind of networked device, such as a personal computer, tablet computer, server computer, video conferencing console, gaming console, and/or the like. For purposes of this example it is assumed that devices 111-113 receive streaming data and include streaming decoders. However, it is understood that any of devices 111-113 may be capable of both encoding and decoding streaming media.

Network 120 is a network that connects network 110 and a third network 130. For example, network 120 may be the Internet in some embodiments but in various embodiments may include any network of any size or complexity. Network 120 is represented by routers 115-118, which pass packets between networks 110 and 130. Network 120 is conceptually divided into two paths, where a first path includes routers 115 and 116, and where the second path includes routers 117 and 118. Such division is illustrative of the characteristic of some networks to include operability to pass packets along any of multiple paths. Various embodiments may include only a single possible path through network 120, whereas other embodiments may include two or more paths.

Network 130 connects to network 120 by a router 134. Similar to network 110, network 130 may include an enterprise network or a LAN. Devices 131-133 may include any type of network device, such as a personal computer, tablet computer, server computer, video conferencing console, gaming console, and/or the like. For purposes of this example it is assumed that devices 131-133 send streaming data and include streaming encoders. However, it is understood that any of devices 131-133 may be capable of both encoding and decoding streaming media. For instance, in a video conferencing scenario one or more of devices 131-133 may communicate bi-directionally with one or more of devices 111-113 and so each endpoint device may perform both encoding and decoding.

Various embodiments include performing rate adaptation facilitated by the use of feedback. In some examples, a receiving endpoint device (e.g., 111-113) may periodically send feedback, such as an RTCP RR or FB extension, to a sending endpoint device (e.g., 131-133) where the feedback provides an indication of service quality, such as delay or jitter, or may provide a specific value for a bit-rate adjustment. Similarly, any of routers 114-118 and 134 may send network feedback, such as a PCN or ECN marking ratio or an FB message, to a sending device. In a scenario involving network feedback, the network feedback may be sent by a router closest to the receiving device (e.g., router 114), though the scope of embodiments contemplates network feedback from any router along a network path.

In some embodiments, whether the feedback is sent by an endpoint device or a network device, the feedback may include a quantitative bandwidth (bit-rate) suggestion. A sending device receives the feedback and adjusts the encoding rate if appropriate. Various embodiments are applicable to interactive video applications (e.g., teleconferencing), as well as to any other streaming technology now known or later developed including, but not limited to, VoIP, music and movie streaming, and the like. In a scenario where a sending endpoint calculates a quantitative bit-rate suggestion, such suggestions may not be included in the feedback because it is the sending endpoint itself that adjusts its bit-rate. Nevertheless, the sending endpoint may calculate a quantitative bit-rate adjustment based on feedback received from the network or a receiving endpoint.

Figure 2:
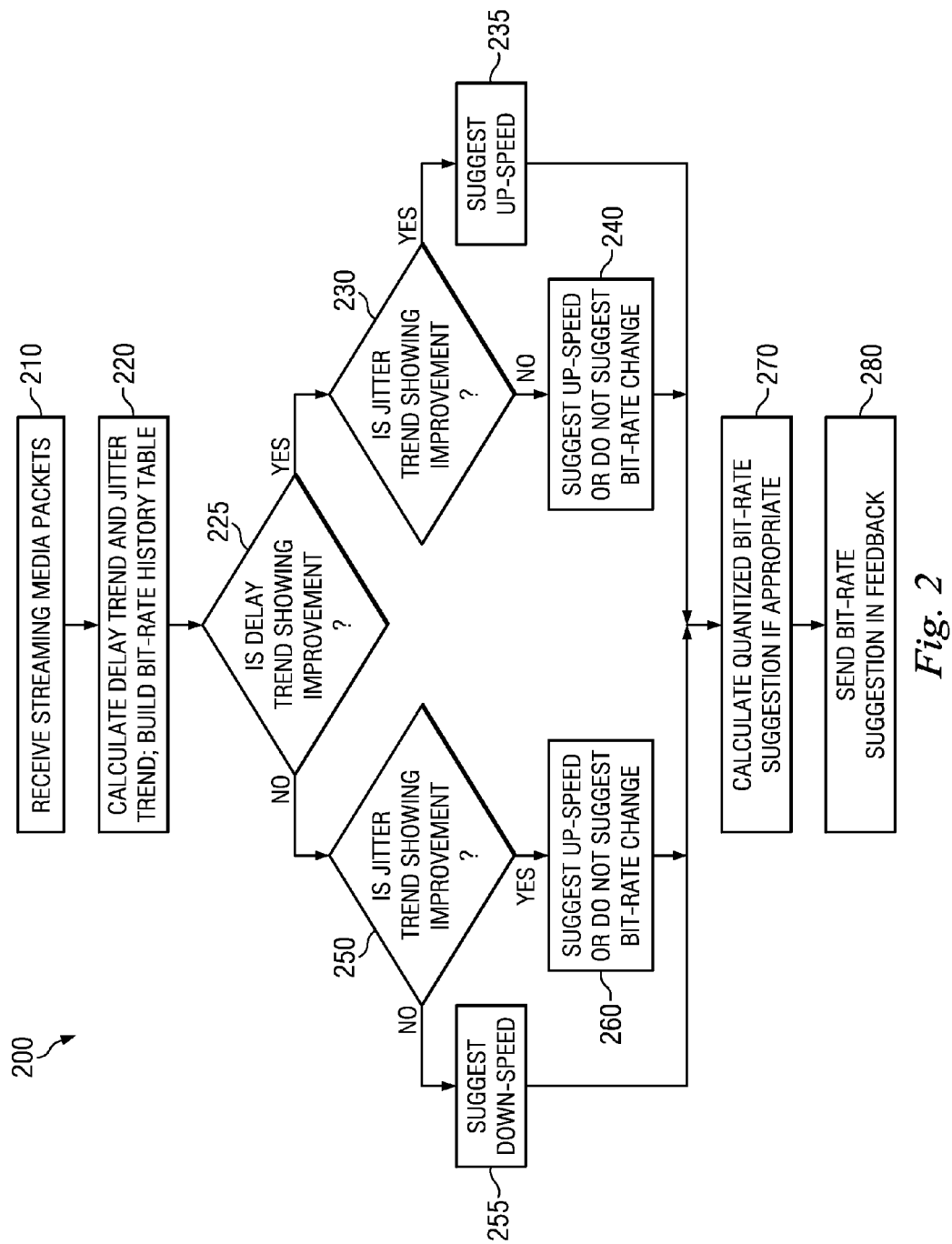
FIG. 2 is an illustration of an example method adapted according to an embodiment.

FIG. 2 is an illustration of example method 200 adapted according to an embodiment. Method 200 may be performed by a receiving endpoint. Specifically, in some embodiments, method 200 is performed by hardware and/or one or more software processes executing on a processor at a receiving endpoint. The functionality described in method 200 may be implemented in addition to, or alternatively to, other feedback functionality. For instance, some conventional receiving endpoints calculate delay and jitter values and provide RR and FB feedback according to RTCP, and method 200 (which generates specific up-speed and down-speed suggestions from more advanced metrics) may replace or supplement conventional feedback.

In block 210, the receiving endpoint receives streaming media packets. The receiving endpoint uses timestamps in the packets or other techniques to discern delay and jitter in the media streaming session. For instance, delay variation is used in some conventional RTCP systems and includes monitoring the network end-to-end packet delay continuously to determine the delay threshold that beyond the threshold packet loss will most likely happen. The packet delay is continuously monitored by the endpoint. At any moment, once the delay is beyond the threshold, feedback is sent to the encoder to reduce the bit-rate to avoid packet loss. Various embodiments may use any technique now known or later developed to discern delay and jitter.

In block 220, the receiving endpoint calculates delay trend and jitter trend. The receiving endpoint also builds a bit-rate history table.

In this example, delay trend indicates whether the average delay in a predetermined or configured sliding window is moving lower or higher. Therefore, delay reflects whether delay is improving or becoming worse, at least within a particular time window. The interval of the sliding window can control the sensitivity to the transient network status fluctuation. For instance, a longer window may impart less sensitivity to short-term fluctuation, whereas a shorter time window may impart more sensitivity to short-term fluctuation. Within RTCP, end-to-end delay is measured by the receiving endpoint and is made available in the RTCP RR feedback. In some embodiments, the end-to-end delay is tracked during the time window to calculate the delay trend.

Further in this example, jitter trend can be used as an indication whether a delay improvement is stable enough for up-speed or not. Jitter trend indicates whether end-to-end jitter is improving or is getting worse within the time window. Within RTCP systems, end-to-end jitter is measured by a receiving endpoint and is available in the RTCP RR feedback. In some embodiments, the end-to-end jitter is tracked during the time window to calculate the jitter trend.

Continuing with block 220, the endpoint builds a bit-rate history table. Table 1 (below) shows an example bit-rate history table for a window of three samples. It is understood that the scope of embodiments may include a window of any appropriate size. The bit-rate history table includes, for each entry, historical values for delay and jitter as well as an entry for a corresponding, historical bit-rate value.

TABLE 1

| Avg. Delay | Avg. Jitter | Actual bit-rate of the stream |
|---|---|---|
| 100 ms | 50 ms | 768 Kpbs |
| 150 ms | 70 ms | 512 Kbps |
| 50 ms | 30 ms | 1 Mbps |

In block 225, it is discerned whether the delay trend indicates improvement. If the delay trend does indicate improvement, then it is discerned whether the jitter trend shows improvement. If both delay trend and jitter trend show improvement, then at block 235, it may be determined to suggest an up-speed bit-rate adjustment. In some scenarios, block 235 may include suggesting an aggressive up-speed, since both jitter and delay indicate that network conditions may allow a significant amount of additional bandwidth in the media stream.

Returning to block 230, if it is discerned that jitter trend is not showing improvement, then block 240 may include not suggesting a bit-rate change and returning to block 210. Alternatively, block 240 may include suggesting a slow and gradual up-speed.

Returning to block 225, if it is discerned that delay trend is not showing improvement, then at block 250 it is discerned whether jitter is showing improvement. If jitter is not showing improvement, then the endpoint device may determine to suggest a down-speed bit-rate adjustment at block 255. If the jitter trend is showing improvement, despite the delay trend's lack of improvement, then the endpoint device may determine to suggest a slow and gradual up-speed adjustment at block 260. Alternatively, block 260 may include making no bit-rate change suggestion and returning to block 210.

If the endpoint device determines that an up-speed or down-speed suggestion should be made, the method 200 progresses to block 270, where the device calculates a quantized bit-rate suggestion. As described above, entries of actual bit-rate associated with recorded average delay and jitter are stored in the table. The current delay and jitter are used as indices to retrieve a previously measured bit-rate corresponding thereto—BW(h). Assuming current average bit-rate is BW(c), then BW(h)-BW(c) is the amount of bandwidth the endpoint device will suggest changing. Therefore, the quantized bit-rate suggestion may include a bit-rate difference amount, though in other embodiments, the quantized bit-rate suggestion may include an actual target bit-rate. In another example, the endpoint may use a different method, such as a mathematical formula or heuristic algorithm, to suggest a bit-rate adjustment. The scope of embodiments is not limited to any particular technique for calculating a quantized-bit-rate suggestion.

In block 280, the endpoint sends the bit-rate suggestion as a feedback message, thereby controlling the media streaming session (at least in part). In one RTCP example, the specific quantized value may be sent by the receiving endpoint over the network as an FB message, specifically as a Temporary Media Maximum Bit-Rate (TMMBR) value. Other embodiments are not limited to RTCP and may use any kind of appropriate message for sending a quantized bit-rate value. The sending endpoint receives the bit-rate change suggestion and changes the bit-rate of the media streaming session accordingly.

The scope of embodiments is not limited to the specific method shown in FIG. 2. For instance, various embodiments may add, omit, rearrange, or modify one or more actions.

For example, the specific determinations made in blocks 235, 240, 255, 260 may be subject to other factors, such as whether bit-rate is already increasing or decreasing, whether a particular stream has a Quality of Service (QoS) priority assigned to it, a video entropy level of content, a video performance baseline (SLO) of content, a quality index (e.g., an index measuring quality of a stream using, such as, packet loss rate) and the like. The same is true for methods 300 and 400, described below at FIGS. 3 and 4. For instance, in some embodiments network policy, SLO, level of motion, entropy index, and/or calculated video quality index are considered in the algorithm that calculates the target bit-rate for an individual bit-stream. In such an embodiment: the following relations may apply: i) a higher priority flow may get a higher share of the available bandwidth, ii) streams with higher entropy indices may get a higher share of available bandwidth (a higher level of motion or a mode complex video will generally have a higher entropy index), and/or iii) available bandwidth for a given stream may be adjusted to fit within a negotiated SLO for the stream.

Figure 3:
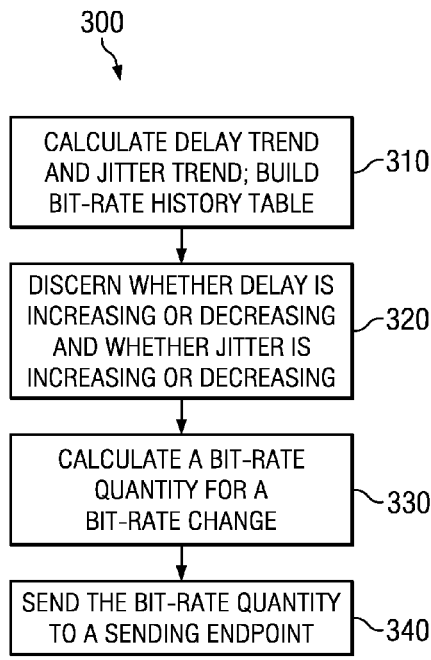
FIG. 3 is an illustration of an example method, adapted according to an embodiment.

FIG. 3 is an illustration of example method 300, adapted according to an embodiment. Method 300 may be performed by a network device. Specifically, in some embodiments, method 300 is performed by hardware and/or one or more software processes executing on a processor at a router or other kind of network device different from a receiving or sending endpoint. The functionality described in method 300 may be implemented in addition to, or alternatively to, other feedback functionality. For instance, some conventional network devices detect or predict network congestion and provide ECN/PCN feedback according to RTCP, and method 300 may replace conventional ECN/PCN feedback or may supplement such conventional feedback.

In block 310, the network device calculates a delay trend and a jitter trend. In some embodiments the network device may calculate delay trend and jitter trend in a manner similar to that described above with respect to block 220 of FIG. 2. Furthermore, in some embodiments, the network device may generate numbers for delay, jitter, and bit-rate on its own, whereas in other embodiments the network device may receive delay, jitter, and bit-rate information by analyzing feedback from a receiving endpoint.

Further in block 310, the network device builds a bit-rate history table. The network device may build a table such as Table 1 (above) in a manner similar to that described above with respect to block 220 (FIG. 2).

In block 320, the network device discerns whether the delay is increasing or decreasing and whether the jitter is increasing or decreasing. A similar process is shown in blocks 225, 230, and 250 of FIG. 2.

In block 330, the network device calculates a bit-rate quantity for a bit-rate change. The bit-rate quantity may be a difference value or may be a target bit-rate. In any event, the network device may calculate the bit-rate quantity similarly to that described above with respect to blocks 235, 240, 255, 260, and 270 of FIG. 2.

In block 340, the network device sends the bit-rate suggestion to a sending endpoint. In one example, the network device generates and sends an FB TMMBR message with the quantized value therein, as described above with respect to block 280 of FIG. 2. In this manner, the media streaming session is controlled, at least in part, by the network device.

Figure 4:
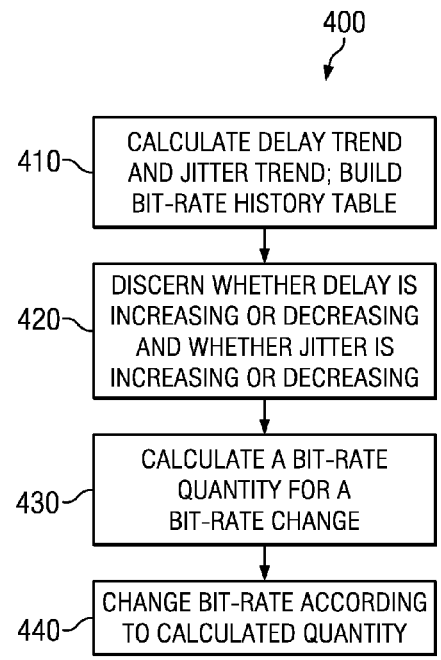
FIG. 4 is an illustration of an example method, adapted according to an embodiment.

FIG. 4 is an illustration of example method 400, adapted according to an embodiment. Method 400 may be performed by a sending endpoint. Specifically, in some embodiments, method 400 is performed by hardware and/or one or more software processes executing on a processor at a sending endpoint. The functionality described in method 400 includes the sending endpoint calculating an up-speed or down-speed adjustment itself. By contrast, in the embodiments consistent with FIGS. 3 and 4, the sending endpoint receives an up-speed or down-speed indication from a downstream device and changes its bit-rate accordingly.

In block 410, the sending endpoint calculates delay trend and jitter trend and builds a bit-rate history table. The sending endpoint does not receive or route the packets of the media stream and, therefore, does not have direct knowledge of the delay or jitter. In such instances, the sending endpoint may acquire values for delay and jitter through received feedback from either or both of a receiving endpoint or a network device. For example, if information about delay and jitter are sent by a receiving endpoint in an RR message, then the sending endpoint may build the table (e.g., Table 1) and calculate delay trend and jitter trend from that data. Some embodiments propose that a network device may send data regarding delay and jitter, perhaps in RR messages, and in those instances the sending endpoint will receive the data and build the table and calculate delay trend and jitter trend therefrom.

In block 420, the sending endpoint discerns whether the delay is increasing or decreasing and whether the jitter is increasing or decreasing. A similar process is shown in blocks 225, 230, and 250 of FIG. 2.

In block 430, the sending endpoint calculates a bit-rate quantity for a bit-rate adjustment. The bit-rate quantity may be a difference value or may be a target bit-rate. In any event, the sending endpoint may calculate the bit-rate quantity similarly to that described above with respect to blocks 235, 240, 255, 260, and 270 of FIG. 2.

In block 440, the sending endpoint changes a bit-rate according to the calculated quantity. In this embodiment, the sending endpoint itself calculates the bit-rate quantity, so that it is not necessary to feed the bit-rate quantity back to another device. The sending endpoint simply uses the value to change its encoding rate.

Methods 200-400 are shown as series of discrete actions with beginning and ends. However, it is noted that the scope of embodiments includes processes that repeat in many cycles during a streaming session so that a given process ends when its corresponding streaming session ends.

As explained above, various embodiments provide techniques for placing functionality in one or more endpoints or in network devices to change an encoding bit-rate at a sending or encoding endpoint. Embodiments that implement the functionality in network devices may provide some additional features over other conventional systems.

For instance, network devices may add additional functionality by virtue of their ability to see multiple media streaming sessions. In such instances, session priority can be used by the algorithm to selectively send the feedback to sending endpoints. For example, during a congestion scenario, the network device may send an up-speed notification to a high priority video stream and send a down-speed notification to a low priority video stream. Therefore, the network device may reduce congestion while at the same time preserving a QoS for a media streaming session with a high priority. As congestion increases or subsides, the network device may adjust the encoding bit-rates accordingly as it continually monitors the streams.

Additional parameters include video entropy (level of motions and content complexity), video performance baseline (SLO), and the like, which can be used by the algorithm to selectively send the feedback to endpoints. Thus, in one example, as more bandwidth becomes available, a stream with lower entropy may not get an up-speed notification while stream(s) with higher entropy may get up-speed notifications first. Similarly, in another example lower quality video streams may be allowed to up-speed first before other video streams that have a satisfactory video quality.

Thus, it is possible for a network device that sees multiple streams to manage congestion in the network. Similarly, a sending endpoint that provides multiple streams itself over a common network may also adjust encoding bit-rate according to stream priority (or video entropy or SLO) as congestion increases or subsides.

Additionally or alternatively to calculating a target bit rate, some network devices may use other techniques to manage a plurality of streams. In some embodiments network devices can calculate the packet drop rate or ratio of ECN or PCN marked packets according to the calculated target bit-rate and/or other factors. The router output queuing system will use these numbers to discard packets or mark packets with ECN/PCN accordingly. Receiving endpoint devices and downstream network devices observe packet drop rate and/or the ECN or PCN ratio and relay such information to the encoder via a RTCP report. The encoder changes the bit rate accordingly.

A network device may calculate a packet drop rate and/or ECN/PCN ratio in accordance with jitter trend, delay trend, and bandwidth history, as described above with respect to FIG. 2. Additionally, or alternatively, the system may use other factors, such as QoS, network policy, entropy index, video quality index, and/or the like to calculate the packet drop rate and/or ECN/PCN ratio. A network device can use the calculated drop rate in a Weighted Random Early Detection (WRAD) algorithm as the packet drop rate during buffer overflow or router interface output congestion.

Some embodiments may be used with endpoints that are older and may not be able to process a feedback signal that indicates a target bit rate. In such a scenario, a network device can use a packet drop rate and/or ECN/PCN ratio in the feedback loop to change the bit rate at one or more endpoints. In other words, some network devices are able to control the bit rates of sending endpoints by manipulating values of packet drop rate and/or ECN/PCN ratio stream-by-stream. In this way, packet drop rate and/or ECN/PCN ratio is used as a proxy for a target bit rate value.

An example embodiment determines relative bit rates and then adjusts packet drop rate and/or ECN/PCN ratio among the various streams to achieve the desired relative bit rates. Furthermore, when controlling the bit rates of multiple streams, the following relations may apply: i) a higher priority stream may get a lower drop rate or a lower ECN/PCN ratio, ii) a video with higher entropy may get a lower drop rate or a lower ECN/PCN ratio, and iii) a packet drop rate and/or ECN/PCN ratio may be used to cause a bit rate to be adjusted to within a negotiated SLO for the stream.

Figure 5:
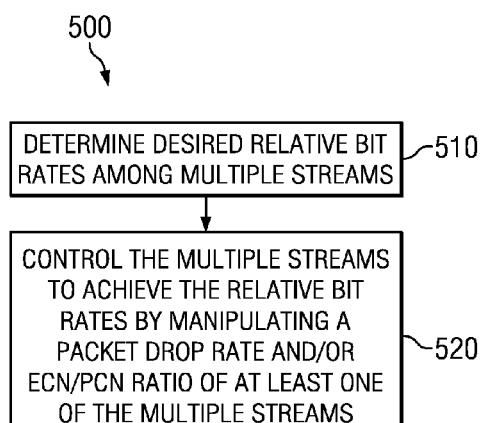
FIG. 5 is an illustration of an example method, adapted according to an embodiment.

FIG. 5 is an illustration of example method 500, adapted according to an embodiment. Method 500 may be performed by a network device. Specifically, in some embodiments, method 500 is performed by hardware and/or one or more software processes executing on a processor at a router or other kind of network device different from a receiving or sending endpoint. In block 510, the network device determines desired relative bit rates among the multiple streams. The desired relative bit rates may be determined based upon at least one of QoS priority, network policy, entropy index, video quality index, and/or the like. In block 520, the network device controls the multiple streams to achieve the relative bit rates by manipulating a packet drop rate and/or ECN/PCN ratio of at least one of the multiple streams. In this manner, the network device achieves a fair sharing of bandwidth among the streams while maximizing measured quality.

Figure 6:
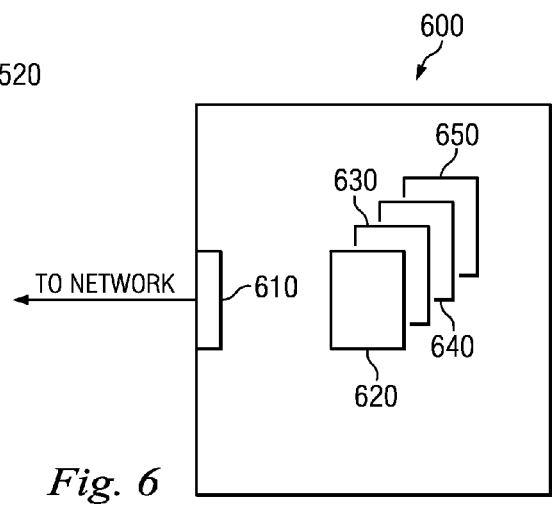
FIG. 6 is an illustration of an example device, adapted according to an embodiment.

FIG. 6 is an illustration of example device 600 adapted according to an embodiment. Device 600 may be included in a sending endpoint, a receiving endpoint, or a network device. For instance and without limitation, device 600 may be implemented as a router or may be implemented as a general purpose computer or server computer. Device 600 is programmed to implement the actions of FIG. 2, 3, 4 or 5. Device 600 includes a network input/output 610, a processor 620, and units 630, 640, 650 that include functionality provided by processor 620.

Units 630, 640, 650 are shown conceptually and illustrate processes running on processor 620 as device 600 implements the actions of FIG. 2, 3, 4, or 5. Unit 630 analyzes data received through network input/output 510 to calculate an average packet delay trend for a media streaming session and a jitter trend for the media streaming session. Calculating delay trend and jitter trend are discussed in more detail above with respect to FIG. 2. Unit 630 may also store a table, such as that shown above as Table 1.

Unit 640 calculates a specific, quantified up-speed or down-speed value in response average packet delay trend and the jitter trend. The quantified value may be a difference value or may include a target value. Calculating the quantified value is described in more detail above with respect to FIG. 2.

Unit 650 controls a bit-rate of the media streaming session according to the quantified up-speed or down-speed value. In an embodiment wherein the device 600 is included in a receiving endpoint or a network device, unit 650 may send one or more message packages to a sending endpoint via network input/output 610. In an embodiment wherein the device 600 is included in a sending endpoint, unit 650 may directly adjust the encoding bit-rate.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

The computer-executable instructions may be executed by processor 620, which may include a general purpose Central Processing Unit (CPU), a special purpose CPU (e.g., a digital signal processor), a Field Programmable Gate Array (FPGA), an Application Specific Integrated Circuit (ASIC), and/or the like. In fact, persons of ordinary skill in the art may utilize any number of suitable structures capable of executing logical operations according to the embodiments of the present disclosure.

Various embodiments may provide one or more advantages over conventional RTCP systems. For instance, various embodiments described above provide for more precise control of an encoding bit-rate by calculating a specific, quantitative value for an up-speed or down-speed suggestion. The quantitative value is generated by processes that provide more intelligence than conventional systems which merely provide alerts for delay, jitter, and congestion.

Additionally, as described above, some embodiments may be implemented in network devices, allowing one or more network devices to more precisely control the media encoding rates of multiple streaming sessions. Such embodiments may provide a better balance between congestion control and QoS commitments by discriminating among higher- and lower-priority streams.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
   (a) discerning, by a router, whether an average packet delay in a media streaming session in a computer network is increasing or decreasing over a first defined time window;
   (b) discerning, by the router, whether an average jitter in the media streaming session in the computer network is increasing or decreasing over a second defined time window;
   (c) in response to (a) and (b), calculating by the router a specific bit-rate quantity corresponding to a change in bit-rate, wherein (c) includes accessing a table that includes a plurality of entries, wherein each entry includes a previous value for packet delay, jitter, and bit-rate for the media streaming session, using at least one of a current value of delay or a current value of jitter as an index to match to a previous bit-rate in the table, and calculating a difference between a current bit-rate and the previous bit-rate in the table to generate a specific up-speed or down-speed value; and
   (d) controlling, by the router, a bit-rate of the media streaming session in accordance with the specific bit-rate quantity.

2. The method of claim 1 in which (c) comprises:
   calculating a specific bit-rate for an up-speed adjustment in response to discerning that the average packet delay is decreasing in (a) and that the jitter is decreasing in (b).

3. The method of claim 1 in which (c) comprises:
   calculating a specific bit-rate for an up-speed adjustment in response to discerning that the average packet delay is decreasing in (a) and that the jitter is not increasing in (b).

4. The method of claim 1 in which (c) comprises:
   calculating a specific bit-rate for a down-speed adjustment in response to discerning that the average packet delay is increasing in (a) and that the jitter is increasing in (b).

5. The method of claim 1 in which the method is performed by the router analyzing feedback from a decoding endpoint, further in which (c) comprises:
   calculating the specific bit-rate quantity by taking into account at least one of a session priority of the media streaming session, a video entropy level, or a video performance baseline; and further in which (d) comprises:
   sending an indication of the specific bit-rate quantity to an encoding endpoint.

6. An apparatus comprising:
   a router including:
   a network input/output;
   a processor, and
   a memory in communication with the processor, the memory including instructions executable by the processor to perform the following operations:

a first operation that analyzes data received through the network input/output to calculate an average packet delay trend for a media streaming session and a jitter trend for the media streaming session in a computer network;

a second operation that calculates a quantified up-speed or down-speed value in response average packet delay trend and the jitter trend, including accessing a table that has a plurality of entries, wherein each entry includes a previous value for packet delay, jitter, and bit-rate for the media streaming session, using at least one of a current value of delay or a current value of jitter as an index to match to a previous bit-rate in the table, and calculating a difference between a current bit-rate and the previous bit-rate in the table to generate the quantified up-speed or down-speed value; and a third operation that controls a bit-rate of the media streaming session in the computer network according to the quantified up-speed or down-speed value.

7. The apparatus of claim 6, in which the third operation sends feedback over a network to an encoding endpoint.

8. The apparatus of claim 6 further comprising:
at least one processor executing computer-readable code to provide the functionality of the first, second, and third operations.

9. Logic encoded in one or more non-transitory tangible media for execution and when executed operable to cause a router to perform the following functions:
  (a) calculate whether an average packet delay in a media streaming session in a computer network is moving lower or higher;
  (b) calculate whether a jitter in the media streaming session in the computer network is improving or worsening;
  (c) store a record of historical values for jitter and average packet delay and historical values for streaming bit-rate correlated with respective historical values for jitter and average packet delay;
  (d) in response to (a) and (b), calculate a difference between a current streaming bit-rate and a specific one of the historical values for streaming bit-rate to generate an up-speed or down-speed value, including accessing a table that has the record of historical values for jitter and average packet delay and historical values for streaming bit-rate correlated with respective historical values for jitter and average packet delay, and using at least one of a current value of delay or a current value of jitter as an index to match to one of the historical values of streaming bit rate, and calculating a difference between a current bit-rate and the one of the historical values of streaming bit rate bit-rate in the table to generate the up-speed or down-speed value; and
  (e) control a bit-rate of the media streaming session according to the up-speed or down-speed value.

10. The logic of claim 9 in which (d) comprises:
calculating a specific bit-rate for an up-speed adjustment in response to discerning that the average packet delay is moving lower in (a) and that the jitter is decreasing in (b).

11. The logic of claim 9 in which (d) comprises:
calculating a specific bit-rate for an up-speed adjustment in response to discerning that the average packet delay is moving lower in (a) and that the jitter is not increasing in (b).

12. The logic of claim 9 in which (d) comprises:
calculating a specific bit-rate for a down-speed adjustment in response to discerning that the average packet delay is moving up in (a) and that the jitter is increasing in (b).

13. The logic of claim 9, in which (e) comprises:
sending an indication of up-speed or down-speed value to an encoding endpoint.

14. The logic of claim 9, in which (a) comprises analyzing feedback from a decoding endpoint, and further in which (e) comprises sending an indication of the up-speed or down-speed value to an encoding endpoint.

* * * * *